(12) United States Patent
Hagino

(10) Patent No.: US 6,748,476 B2
(45) Date of Patent: Jun. 8, 2004

(54) CONTROL SYSTEM INCLUDING CONTROLLER AND FIELD DEVICES

(75) Inventor: Yuuichi Hagino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 547 days.

(21) Appl. No.: 09/789,646

(22) Filed: Feb. 21, 2001

(65) Prior Publication Data

US 2001/0016891 A1 Aug. 23, 2001

(30) Foreign Application Priority Data

Feb. 21, 2000 (JP) ........................................ 2000-042798

(51) Int. Cl.[7] .............................. G06F 13/00; H04Q 7/00
(52) U.S. Cl. ........................... 710/305; 709/220; 710/9; 714/48
(58) Field of Search ............................. 710/2–4, 9, 305, 710/62, 300, 72; 709/249, 220, 253; 714/25, 48, 42–44; 370/254, 464; 361/729, 733; 700/9; 455/561

(56) References Cited

U.S. PATENT DOCUMENTS

| 4,827,908 A | * | 5/1989 | Matsuo |
| 5,301,294 A | * | 4/1994 | Kawai et al. |
| 5,519,878 A | * | 5/1996 | Dolin, Jr. |

* cited by examiner

*Primary Examiner*—Gopal C. Ray
(74) *Attorney, Agent, or Firm*—Kenyon & Kenyon

(57) ABSTRACT

A control system having improved maintainability and operability is provided. To this end, in a control system comprising a plurality of field devices distributed in equipment and a controlling input/output device, and a host controller connected to the plurality of field devices via a transmission line and controlling the field devices, the field devices and the host controller constituting a network in the equipment for control of the equipment, the control system further comprises a plurality of connectors for connecting the plurality of field devices to the transmission line, the connectors having network IDs representing respective connected positions to the network, and a node address creating unit for generating node addresses based on the network IDs.

6 Claims, 9 Drawing Sheets

CONTROL SYSTEM INCLUDING CONTROLLER AND FIELD DEVICES

BACKGROUND OF THE INVENTION

1. Field of the Invention

The present invention relates to a control system comprising a controller and field devices distributed in equipment, which are interconnected via a transmission line so as to construct a network.

2. Description of the Related Art

In equipment represented by manufacturing apparatus and inspecting apparatus used in the field of semiconductor production, analyzing apparatus and automation apparatus used in the field of medical service, etc., it has been conventional that an equipment controller board for controlling the entire equipment and I/O boards are both arranged in a single rack, and an equipment controller controls input means, such as sensors, and output means, such as motors and valves, in a centralized manner. Also, the input/output means, such as motors, valves and sensors, in the equipment are connected to the I/O boards in the rack in one-to-one relation by wiring of special cables. The equipment controller then controls the input/output means via the I/O boards individually. In such a conventional arrangement, therefore, the input/output means cannot be controlled without the equipment controller.

Recently, field devices incorporating microprocessors therein have been developed and put into practice with an improvement of the semiconductor integrated circuit technology. Input/output means, such as motors, valves and sensors, are connected to the field devices, which are made intelligent to be able to control the input/output means by the incorporated microprocessors. Thus, the field devices take over a portion of the measuring and control functions that have so far been performed by an equipment controller. According to one proposal, a transmission line interconnects an equipment controller and a plurality of field devices such that these field devices are connected to the same transmission line in multi-drop fashion. The equipment controller and the field devices construct a system in which two-way communication is carried out via a network using digital signals, whereby the amount of wiring required in equipment is cut down.

In a field network, generally, each field device performs its own operation corresponding to a position at which the field device is connected to the network, and even the field devices having the same function perform different operations from each other depending on their connected positions. By way of example, in a transporting apparatus comprising a first belt conveyor driven by a first motor and a second belt conveyor driven by a second motor, the transport distance of the first belt conveyor is 10 cm and the transport distance of the second belt conveyor is 20 cm. The first motor is controlled by a first field device, and the second motor is controlled by a second field device. Also conventionally, to uniquely define the first and second field devices connected to the transmission line, a specific ID is assigned to each field device.

In a conventional control system using field devices, however, the following problem arises when a failure or any other trouble occurs. For checking the operation of the field devices and the input/output means including a failed one, it is often tried in such a case to attach another normally operating field device to the system instead of the existing one. Because of the field devices having different IDs, however, the attached field device must be set again to the ID corresponding to the connected position, and hence maintainability is poor when the work of checking the operation is performed upon the occurrence of a failure. A similar problem also arises in assembly. When only one field device is usable and employed to check the operation of the field device and the input/output means by attaching it to the system at different positions in turn, the attached field device must be set again to the ID corresponding to the connected position, and therefore maintainability is also poor in the work of checking the operation during assembly.

SUMMARY OF THE INVENTION

Accordingly, it is an object of the present invention to provide a control system having improved maintainability and operability.

To achieve the above object, the present invention provides a control system comprising a plurality of field devices distributed in equipment and controlling input/output means, and a host controller connected to the plurality of field devices via a transmission line and controlling the field devices, the field devices and the host controller constructing a network in the equipment for control of the equipment, wherein the control system further comprises a plurality of connectors for connecting the plurality of field devices to the transmission line, the connectors having network IDs representing respective connected positions to the network, and a node address creating unit for generating node addresses based on the network IDs.

With those features, since the field devices of the same type can be employed in the network in a replaceable manner, the operation can be checked using the field device, which is normally operating, in adjustment work or in the event of a system failure. As a result, maintainability and operability of the control system are improved.

DESCRIPTION OF THE PREFERRED EMBODIMENTS

The construction and operation of a control system according to a first embodiment of the present invention will be described below with reference to FIGS. 1 to 6.

To begin with, the entire construction of equipment employing the control system according to this first embodiment will be described with reference to FIG. 1.

Figure 1:
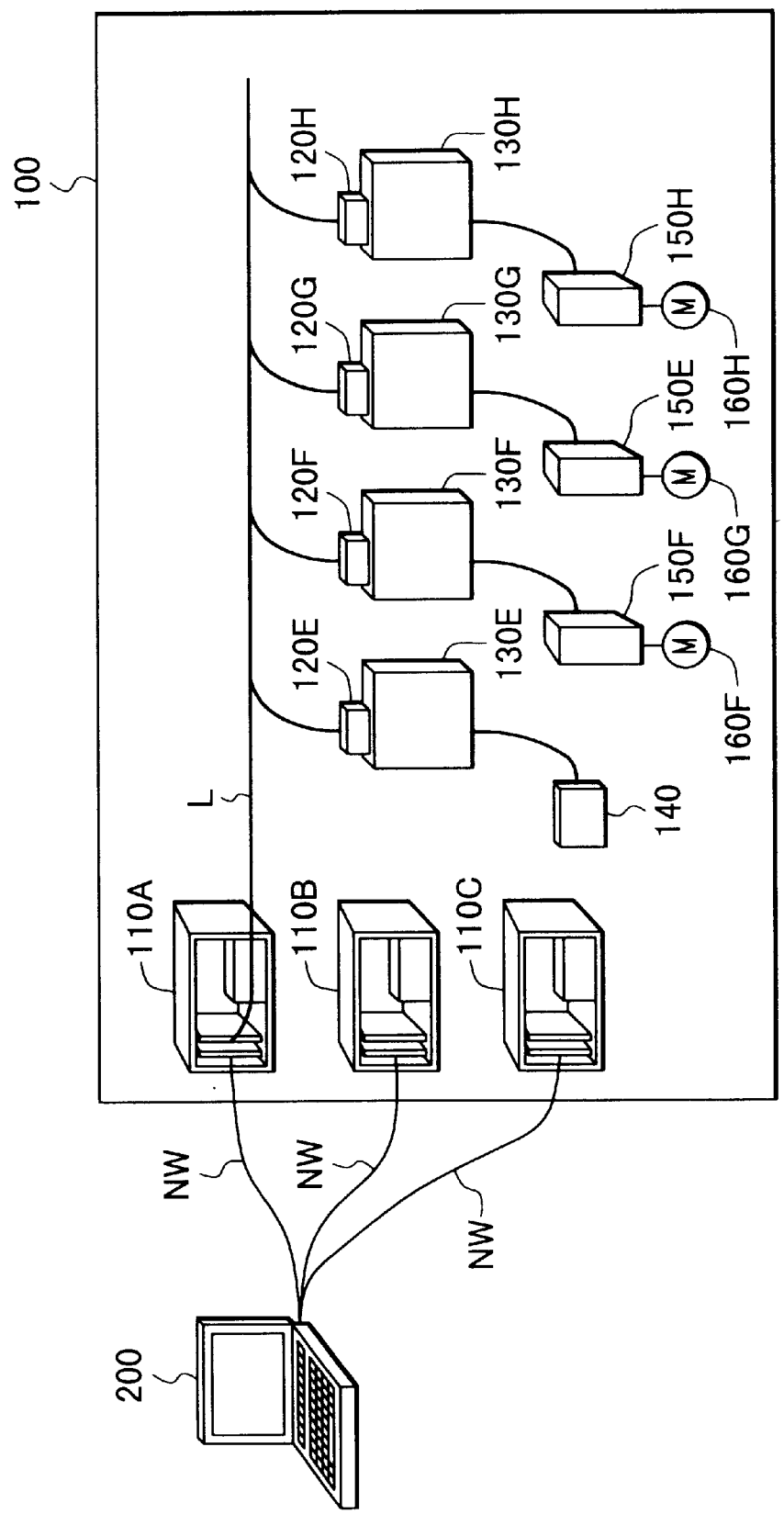
FIG. 1 is a block diagram of the entire construction of equipment employing a control system according to a first embodiment of the present invention.

FIG. 1 is a block diagram of the entire construction of equipment employing the control system according to the first embodiment of the present invention.

Equipment 100 is, for example, one of manufacturing apparatus and inspecting apparatus used in the field of semiconductor production, analyzing apparatus and automation apparatus used in the field of medical service, etc. The equipment 100 includes a plurality of host controllers 110A, 110B and 110C. For example, when the equipment 100 is a semiconductor manufacturing apparatus, the host controller 110A controls driving of a motor for control of a wafer transporting mechanism, and the host controller 110B controls driving of a valve and a pump for control of a pressure in the manufacturing apparatus. The host controller 110A is connected to a plurality of connectors 120E, 120F, 120G and 120H via a transmission line L. A plurality of field devices 130E, 130F, 130G and 130H are connected respectively to the plurality of connectors 120E, 120F, 120G and 120H. The field devices 130E, . . . , 130H incorporate microprocessors therein and function as subordinate controllers with respect to the host controller 110A. A photosensor 140 as one of input means is detachably connected to the field device 130E. The photosensor 140 is used to detect a workpiece being transported (i.e., a wafer). Motor drivers 150F, 150G and 150H are detachably connected respectively to the field devices 130F, 130G and 130H. Also, motors 160F, 160G and 160H are connected respectively to the motor drivers 150F, 150G and 150H. In addition, the host controllers 110A, 110B and 110C are connected via a control network NW to an operator's console 200 provided externally of the equipment 100.

The host controllers 110A, 110B and 110C interpret commands transmitted from the operator's console 200 via the control network NW, and then start respective sequences. One of the sequences describes a threshold for an output value of the sensor, the order in which the motors are to be driven, and so on. In accordance with the sequence, the host controller 110A exchanges communication with the field devices 130E, . . . , 130H using digital signals via the transmission line L. For example, when an output value of the photosensor 140 exceeds the threshold, the field device 130E transmits a message to the host controller 110A via the transmission line L for notification to the host controller 110A. Upon receiving the message from the field device 130E, the host controller 110A transmits a control signal for motor driving to the field device 130F. Upon receiving the control signal from the host controller 110A, the field device 130F outputs a control signal to the motor driver 150F in accordance with an internal control program, thereby controlling the driving of the motor 160F. For example, the motor 160F drives a first belt conveyor so that a wafer is transported to a predetermined position. When transport control of the wafer by the field device 130F is completed, the field device 130F outputs a control signal to the field device 130G via the transmission line L. Upon receiving the control signal from the field device 130F, the field device 130G outputs a control signal to the motor driver 150G in accordance with an internal control program, thereby controlling the driving of the motor 160G. For example, the motor 160G drives a second belt conveyor so that the wafer is transported to another predetermined position. Further, when transport control of the wafer by the field device 130G is completed, the field device 130G outputs a control signal to the field device 130H via the transmission line L. Upon receiving the control signal from the field device 130G, the field device 130H outputs a control signal to the motor driver 150H in accordance with an internal control program, thereby controlling the driving of the motor 160H. For example, the motor 160H drives a third belt conveyor so that the wafer is transported to still another predetermined position. After executing a series of the above-described operations in order, the sequence is ended.

In this first embodiment, the plurality of field devices 130E, . . . , 130H are connected to the same transmission line L in multi-drop fashion, and node addresses are used to uniquely identify the field devices 130E, . . . , 130H.

The configuration of the node address for use in the control system according to this first embodiment will be next described with reference to FIG. 2.

Figure 2:
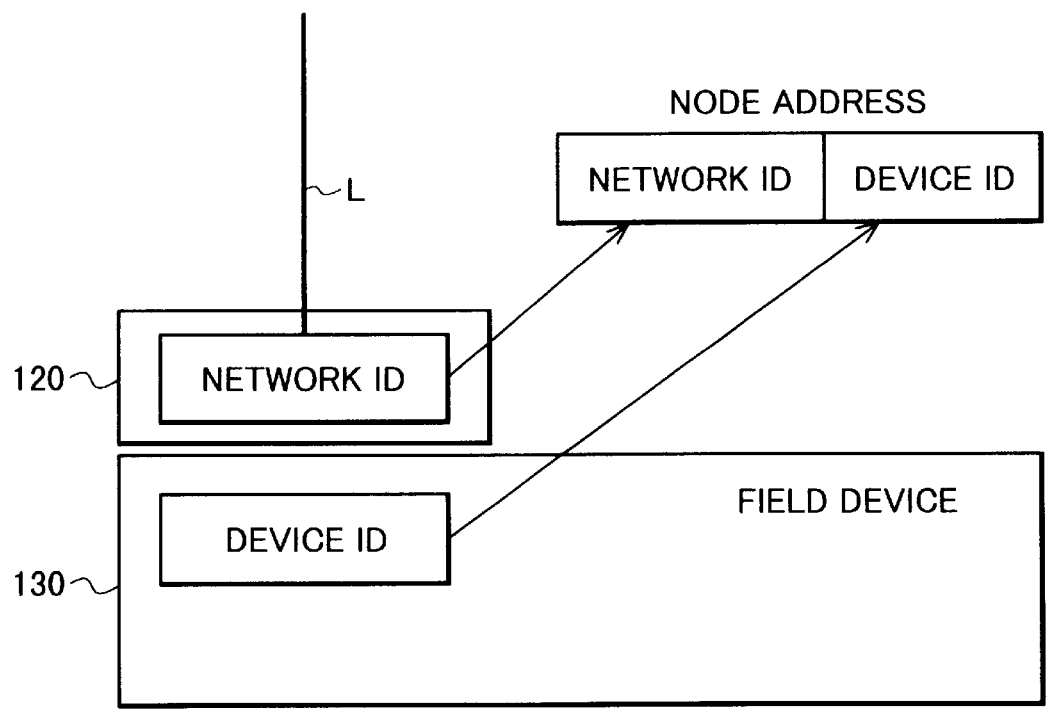
FIG. 2 is a representation for explaining a node address for use in the control system according to the first embodiment of the present invention.

FIG. 2 is a representation for explaining the node address for use in the control system according to the first embodiment of the present invention.

In this first embodiment, each node address is derived from a network ID possessed by the connector 120 (120E, 120F, 120G or 120H) and a device ID possessed by the field device 130 (130E, 130F, 130G or 130H). The node address comprises, e.g., (n+m) bits in which the network ID of n bits are allocated to the higher-order bits and the device ID of m bits are allocated to the lower-order bits. Given n=8 and m=8, for example, the node address of 16 bits is created from the network ID of 8 bits and the device ID of 8 bits. Because of communication being carried out using the node address, however, if the node address is redundant, the overhead in communication is uselessly increased. The configuration of the node address is therefore selected as appropriate depending on the network scale and the communication band. As another example, the node address may comprise 12 bits created from the network ID of 6 bits and the device ID of 6 bits, or 8 bits created from the network ID of 4 bits and the device ID of 4 bits.

The network ID is different for each of the connectors 120E, 120F, 120G and 120H connected to the same transmission line L. For example, when the network ID is of a 4-bit configuration, the network ID of the connector 120E is "0001"; the network ID of the connector 120F is "0010"; the network ID of the connector 120G is "0011"; and the network ID of the connector 120H is "0100". Also, the device ID is different for each type of the field devices 130E, . . . , 130H. More specifically, since the field devices 130F, 130G and 130H are field devices for motor driving, they are assigned with the same device ID. For example, when the device ID is of a 4-bit configuration, the device ID of the field device 130E is "1000" and the device IDs of the field devices 130F, 130G and 130H are each "1001".

Accordingly, the node address of the field device 130E is "00011000"; the node address of the field device 130F is "00101001"; the node address of the field device 130G is "00111001"; and the node address of the field device 130H is "01001001". Thus, respective node addresses can be uniquely allocated to the field devices 130E, . . . , 130H.

By uniquely setting the node address based on the network ID and the device ID and assigning the same device ID to the field devices of the same type as described above, operability in maintenance and assembly can be increased. For example, when a first transporting mechanism controlled by the field device 130F has failed to operate, there is a possibility that a failure has occurred in the field device 130F, the motor driver 150F or the motor 160F. In such an event, the field device 130F, which may have failed, is first disconnected from the network. More specifically, in view of that the field device 130F is connected to the transmission line L through the connector 120F, the field device 130F is disconnected from the connector 120F, and in addition the connection between the field device 130F and the motor driver 150F is also cut off. Since the end of a connecting line of the motor driver 150F is connected to the field device 130F using a coupler, a connector or the like, it is easy to cut off the connection between the field device 130F and the motor driver 150F. Then, another field device 130G which is normally operating is connected between the connector 120F and the motor driver 150F. A new node address of the first transporting mechanism is determined by the network ID of the connector 120F and the device ID of the field device 130G newly connected to the connector 120F. Because of the field device 130F and the field device 130G having the same device ID, however, the node address of the first transporting mechanism is not changed even after the field device 130F has been replaced by the field device 130G. In this condition, a control signal for operating the first transporting mechanism is outputted from the host controller 110A to operate the motor 160F. If the motor 160 operates normally, it is easily confirmed that the field device 130F has failed. Also, if the first transporting mechanism does not operate normally even after replacing the field device 130F by the field device 130G, it is easily confirmed that the motor driver 150F or the motor 160F has failed.

Further, even when the field device, the motor driver and the motor are not all prepared in the required number prior to the start of assembly, the checking work can be performed using one field device of the same type. In the construction of FIG. 1, for example, if the field device 130F, the motor driver 150F and the motor 160F are prepared whereas the field devices 130G, 130H, the motor drivers 150G, 150H and the motors 160G, 160H are not prepared, a test adjustment of the first transporting mechanism is first performed by connecting the field device 130F, the motor driver 150F and the motor 160F to the connector 120F. Then, a test adjustment of the second transporting mechanism is performed by connecting the field device 130F, the motor driver 150F and the motor 160F to the connector 120G. Likewise, a test adjustment of the third transporting mechanism can be performed by connecting the field device 130F, the motor driver 150F and the motor 160F to the connector 120H.

The construction of the field device 130 and the connector 120 for use in the control system according to this first embodiment will be next described with reference to FIG. 3.

Figure 3:
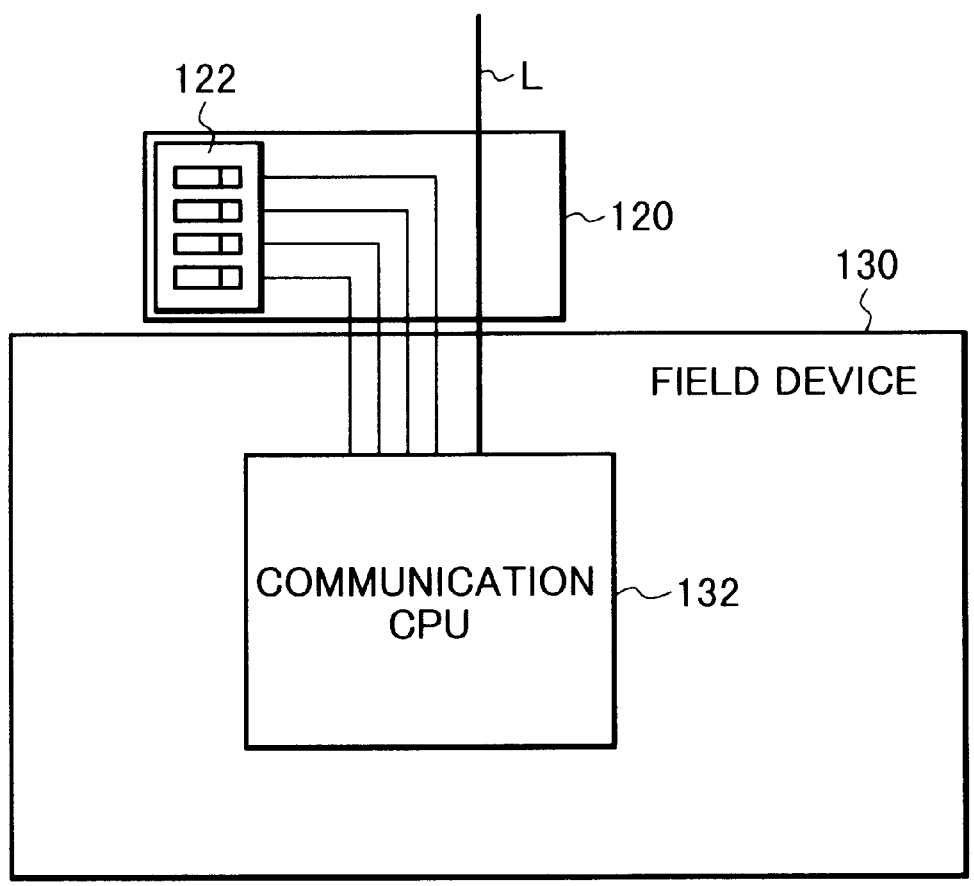
FIG. 3 is a block diagram of the construction of a field device and a connector for use in the control system according to the first embodiment of the present invention.

FIG. 3 is a block diagram of the construction of the field device and the connector for use in the control system according to the first embodiment of the present invention.

The connector 120 includes a DIP switch 122. The DIP switch 122 holds the network ID of the connector 120, which is unique on the network. The setting of the network ID can be changed by shifting on/off positions of the DIP switch 122. The field device 130 includes a communication CPU 132. The communication CPU 132 is connected to the transmission line L and the DIP switch 122.

The communication CPU 132 reads the setting value (network ID) of the DIP switch 122 into an internal register. Based on both the read setting value and the device ID determined depending on the type of the field device 130, the communication CPU 132 determines the node address and carries out communication using the node address thus determined. In an illustrated example, the DIP switch 122 is of a 4-bit configuration, and therefore the network ID is expressed by a value of 4 bits. The communication CPU 132 creates a node address of 8 bits by allocating the network ID of 4 bits and the device ID of 4 bits, held by the field device 130, to higher- and lower-order bits of the node address, respectively.

The construction of the host controller 110 for use in the control system according to this first embodiment will be next described with reference to FIG. 4.

Figure 4:
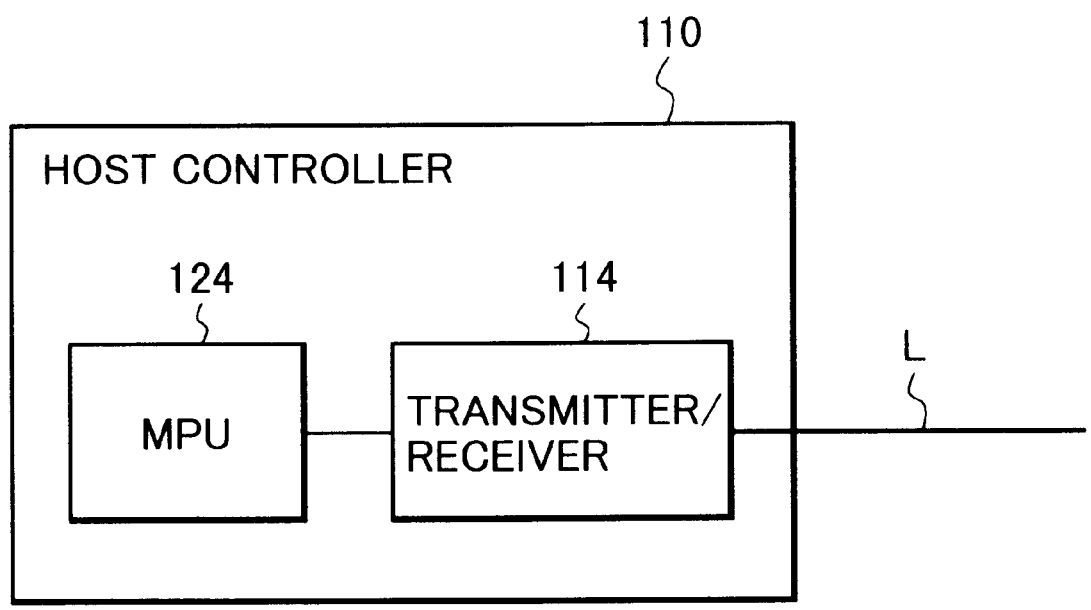
FIG. 4 is a block diagram of the construction of a host controller for use in the control system according to the first embodiment of the present invention.

FIG. 4 is a block diagram of the construction of the host controller for use in the control system according to the first embodiment of the present invention.

The host controller 110 comprises an MPU 112 and a transmitter/receiver 114. In accordance with a communication program stored in the MPU 112, the host controller 110 exchanges communication with the field device that detects, e.g., a sensor output, such as the field device 130E, through the transmitter/receiver 114 and transmission line L, for thereby receiving the sensor output with respect to a control target and executing internal processing to determine the next operation. Then, the host controller 110 transmits control signals to the field devices 130F, . . . , 130H to control the motors, etc. for execution of a sequence. The host controller 110 holds sequences corresponding to commands from the superordinating operator's console 200 in one-to-one relation, and when a command is inputted, it runs a predetermined sequence to perform a series of control steps for the relevant field devices via the transmission line L. When the control operation is completed, the host controller 110 transmits a notice of end to the operator's console 200.

Next, a description will be made of the operation of the host controller 110 for use in the control system according to this first embodiment with reference to FIG. 5, and the operation of the field device 130 for use in the control system according to this first embodiment with reference to FIG. 6.

Figure 5:
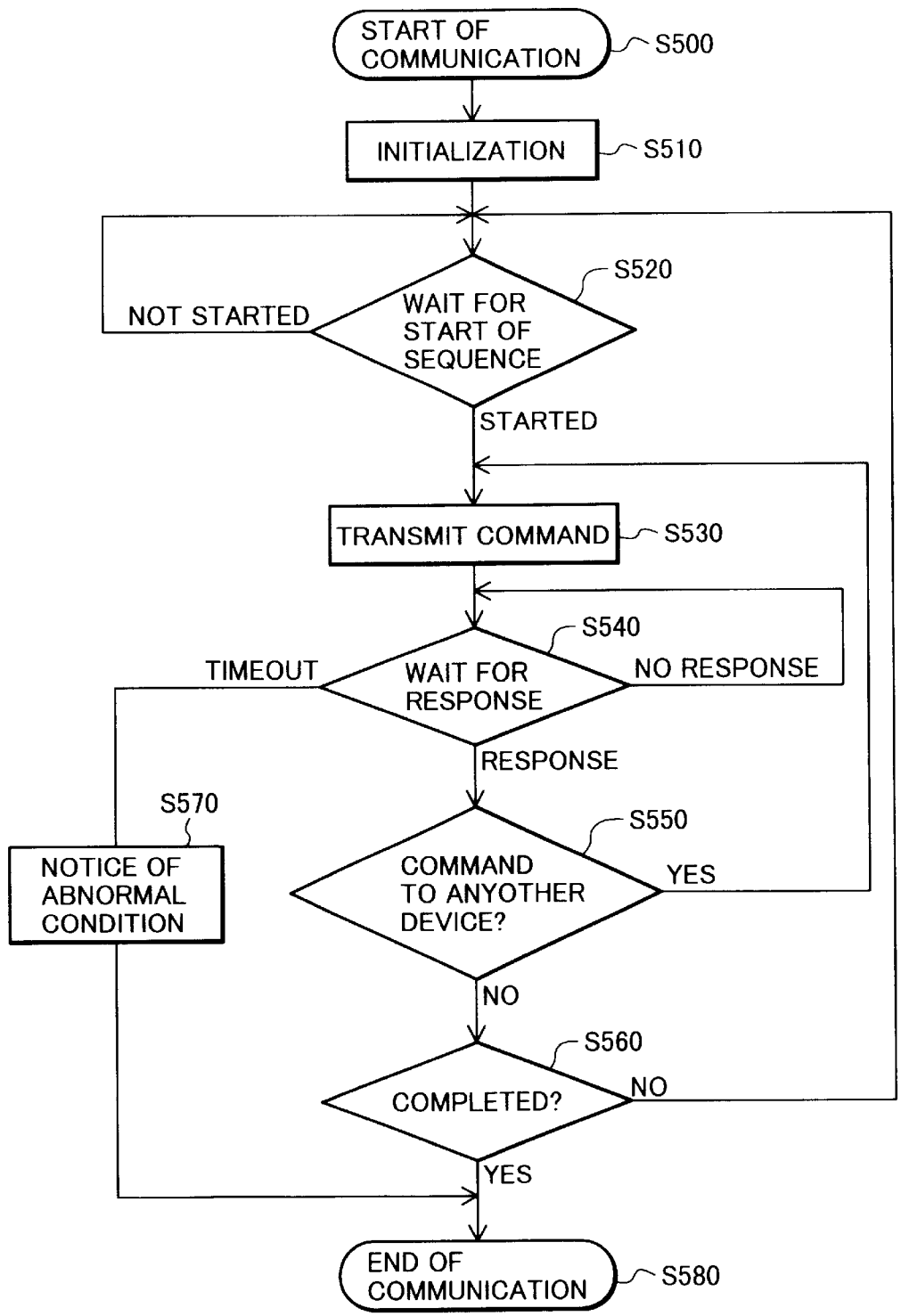
FIG. 5 is a flowchart of the operation of the host controller for use in the control system according to the first embodiment of the present invention.
Figure 6:
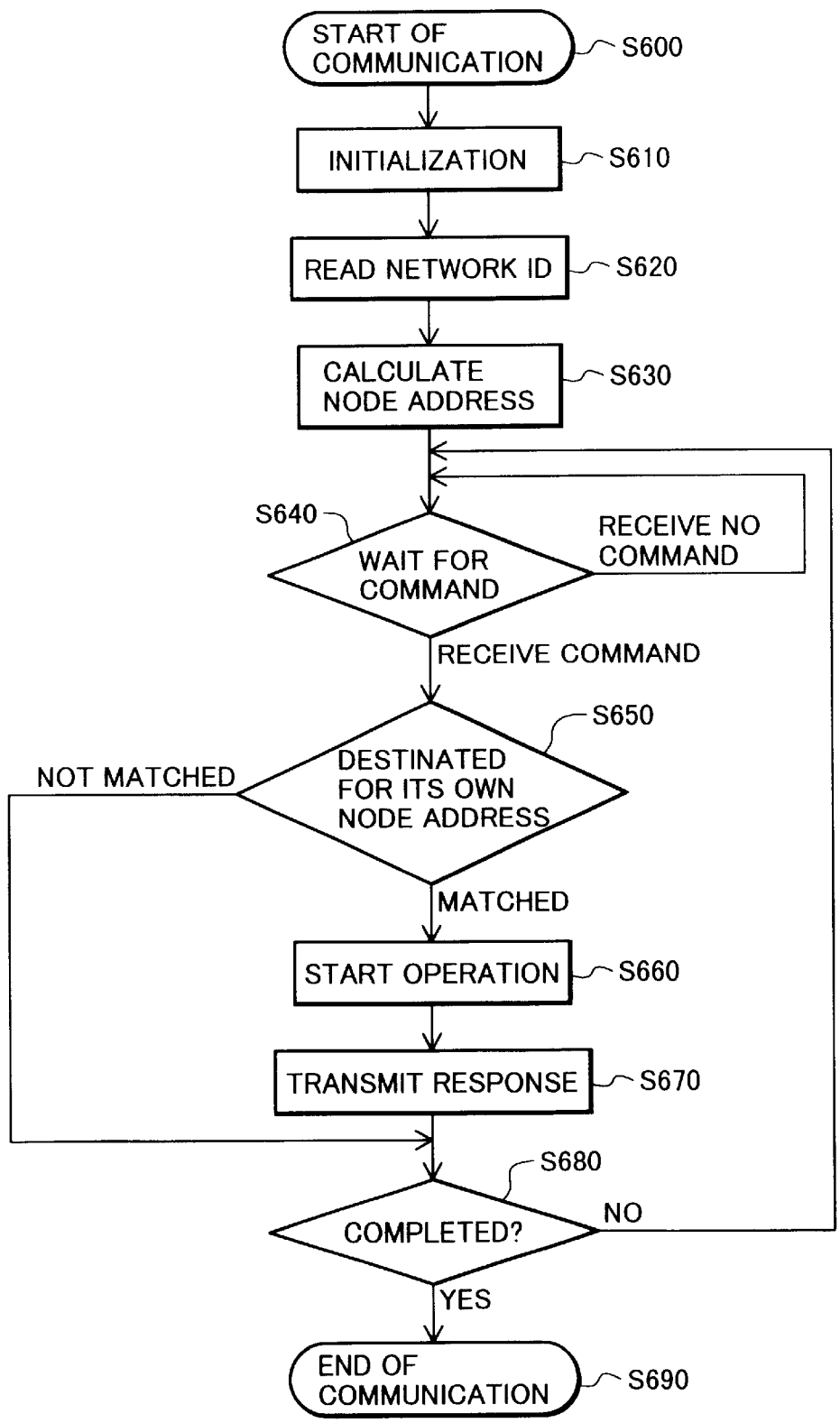
FIG. 6 is a flowchart of the operation of the field device for use in the control system according to the first embodiment of the present invention.

FIG. 5 is a flowchart of the operation of the host controller for use in the control system according to the first embodiment of the present invention, and FIG. 6 is a flowchart of the operation of the field device for use in the control system according to the first embodiment of the present invention.

The operation flow of the host controller 110 is first described with reference to FIG. 5.

In step S500, the host controller 110 initializes the communicating function of each of the field devices 130 at the startup to establish a state where it can exchange communication with each field device 130.

Then, in step S510, the host controller 110 initializes the control network NW connected to the operator's console 200 to establish a state where it can receive commands from the operator's console 200. In step S520, the host controller 110 comes into a standby state waiting for a command to start up a sequence.

When a command is inputted to the operator's console 200 and transmitted to the host controller 110 via the control network NW, the host controller 110 starts up a specific sequence corresponding to the command. The sequence describes commands transmitted to the field devices 130, variables, order, timings, and so on.

In step S530, the host controller 110 transmits commands to the field devices 130 in accordance with the started sequence. The command is transmitted to each field device 130 using a specific node address as described above. The node address is made up of the network ID and the device ID. When the field device 130 is connected to an incorrect connector, the connected field device operates without problems if it is the same type as that intended. However, if the different type of field device 130 is connected to such a connector, the falsely connected field device 130 neither receives the command nor performs any operation because its device ID differs from the correct one. Also, since each network ID is unique in the equipment 100, there is no possibility that the field devices 130 of different types have the same node address. Accordingly, when the field device 130 is incorrectly connected to the connector, it does not receive the command, and hence no response is transmitted to the host controller 110.

Then, in step S540, the host controller 110 comes into a standby state waiting for a response from the field device to which the command has been transmitted. If no response is received within a preset period of time, timeout occurs and the operation flow goes to step S570. If a response is received, the operation flow goes to step S550.

In the event of timeout, this means that an abnormal condition of the network has been detected. Therefore, the host controller 110 transmits a notice of abnormal condition to the operator's console 200 in step S570.

When the correct field device 130 is connected, a response is transmitted to the host controller 110, which continues the sequence upon receiving the response.

Subsequently, in step S550, the host controller 110 determines whether there is a command to any other field device. If there is a command to any other field device, the operation flow returns to step S540, and if there is no more command, the operation flow goes to step S560.

Then, in step S560, the host controller 110 determines whether the sequence has been completed. If not completed, the operation flow returns to step S520, and if completed, the operation flow goes to step S580.

Finally, in step S580, the host controller 110 brings the sequence to an end after complete transmission of all the commands to the field devices 130, and returns to the standby state waiting for another command from the operator's console.

The operation flow of the field device 130 is now described with reference to FIG. 6.

In step S610, the field device 130 initializes a field path at the startup to establish a state where it can receive commands from the host controller 110.

Thereafter, the field device 130 reads a network ID from the connector 120 in step S620, and determines a node address in step S630 by combining the read network ID with a device ID held by the field device 130.

Then, in step S640, the field device 130 comes into a standby state waiting for a command from the host controller 110.

When a command is received, the field device 130 determines in step S650 whether the received command is destined for its own node address.

If the received command is destined for its own node address, the field device 130 executes operations instructed by the command in step S660. Where the field device is one 130E for sensor control, it executes such operations as turning on/off the photosensor 140, reading an output value of the photosensor 140, and transmitting the read output value to the host controller 110. Where the field device is any of the other ones 130F, 130G and 130H for motor driver control, it executes such operations as turning on/off the driving of the motor 160F, 160G or 160H, setting the direction and speed of rotation of the motor, and setting the amount of distance through which a control target is to be moved by the motor.

After the end of the instructed operations, the field device 130 transmits a response to the host controller 110 in step S670.

Then, in step S680, the field device 130 determines whether all of the commands have been completely processed. If not completely processed, the operation flow returns to step S640 where the field device 130 waits for another command.

If no response is replied from the field device 130 to the host controller 110 for a certain period of time in step S670, this means that any abnormal condition has occurred in the network. Therefore, the host controller 110 transmits a notice of abnormal condition to the operator's console 200 in step S570 of FIG. 5. A notice of abnormal condition is transmitted in the following cases.

1) The field device 130 is not normally operating.
2) The field device 130 is not connected to the network.
3) The different type of field device 130 is connected to the connector.
4) The connector is failed.

The case 1) is represented by the event, for example, that the field device 130 cannot normally exchange communication due to runaway of its control CPU. In the case 2), because of the field device 130 being not connected to the network, even when the host controller 110 transmits a command, a corresponding node address does not exist on the network and a response is in no way transmitted. Only when the correct field device 130 is connected to the connector, communication is normally exchanged between the host controller 110 and the field device 130. In the case 3) where the different type of field device 130 is connected to the connector, the correct node address is not created, and therefore no commands are received by that field device. In the case 4) where the connector is failed, it cannot hold the correct network ID.

A manner of confirming the node address in each field device 130 is now described.

The field device 130 broadcasts the node address, which has been created at the startup, over the network to confirm whether the created node address overlaps with any other one. The confirmation is performed by such a manner that each field device transmits its own node address to all of other field devices, and each of the other field devices having received the node address compares it with its own node address, thereby confirming whether the received node address is the same as its own one. If both the compared node addresses are identical to each other, the relevant field device transmits a notice of abnormal condition to the same node address, and turns on an LED indicating a node-address overlap error so that the occurrence of abnormal condition is notified to an operator. The field device 130 having received the notice of abnormal condition also turns on an LED indicating a node-address overlap error, thus enabling the operator to know which ones of the field devices 130 are overlapped in their node addresses with each other.

When there are no field devices having the same node address on the network, a notice of abnormal condition is not transmitted. Therefore, the broadcasting field device 130 starts the normal operation after waiting for a certain period of time and confirming that a notice of abnormal condition is not transmitted.

Since the device ID is determined depending on the type of the field device 130, the fact that there are a plurality of field devices 130 having the same device ID on the network is of no problem. On the other hand, since all network IDs must be each unique on the network, the network is not allowed to include a plurality of field devices 130 having the same network ID. Accordingly, a node-address overlap error can also be detected by checking the network IDs. If a node-address overlap error has occurred, this can be regarded as indicating false setting of the network ID, a connector failure, an anomaly of the field device 130, etc. Further, since each network ID is unique on the network, the network ID may be used as the node address.

As described above, the host controller 110 performs transport control by managing and operating the field devices 130 in accordance with a command from the operator's console 200. Also, the operator's console 200 transmits a command to the host controller 110 in accordance with an input made by the operator. At this time, the field device 130, which is requested to operate, may be connected to another different field device 130 in some cases. However, the operator's console 200 is able to transmit different commands to a plurality of host controllers 110, or to start up several sequencers and transmit commands to a plurality of host controllers 110 in turn.

In this embodiment, the notice of abnormal condition transmitted from the host controller 110 is informed to the operator in the operator's console 200. The operator's console 200 has the functions to indicate several types of errors such as corresponding to the event that no response is transmitted from the field device 130, the event that communication is in no way exchanged with the field device 130, and the event that the source voltage is abnormal. Upon receiving the notice of abnormal condition, the operator checks the system in accordance with the type of abnormal condition indicated on the operator's console 200. For example, if there occurs an error corresponding to the event that no response is transmitted from the field device 130, the operator confirms whether or not there are a plurality of field devices that are set to the same node address. Specifically, if the same network ID is set in duplicate, the field devices 130 having the same network ID make LEDs indicating a node-address overlap error turned on, thus enabling the operator to know that the network IDs are falsely set in those field devices. If such LEDs are not turned on, the error can be regarded as representing, e.g., an anomaly of the field device 130 itself or incorrect connection of the field device 130 to the connector.

By notifying false connection or setting of the field device 130 to the operator with the system arrangement described above, it is possible to facilitate the operations for manufacture, adjustment and maintenance, and to cut down a time required for those operations.

Also, the field device 130 can be replaced by another one of the same type without needing any additional change of the setting. Therefore, for example, when the field devices 130 of the same type are not all prepared prior to the start of adjustment work, the adjustment work can be performed by connecting one field device 130 to the network at a plurality of relevant connected positions in turn. Further, when one field device 130 has failed, another normally operating field device 130 can be substituted for the failed one to check the operation.

As an alternative, by incorporating a plurality of programs in the field device 130 and providing the function of replacing the program depending the network ID, several types of field devices 130 can be constituted as one unit of field device together, and a field device having higher versatility can be fabricated. In this case, for example, when such a versatile field device is temporarily substituted for the existing field device 130 in maintenance work to check the operation, the number of field devices 130 replaceable by such a versatile field device without needing any additional change of the setting is increased and the system maintenance can be facilitated.

Several examples of the construction of a field device 130X and a connector 120X for use in a control system according to a second embodiment of the present invention will be described below with reference to FIGS. 7 to 9.

A first example of the construction of the field device and the connector for use in the control system according to this second embodiment will be described with reference to FIG. 7.

Figure 7:
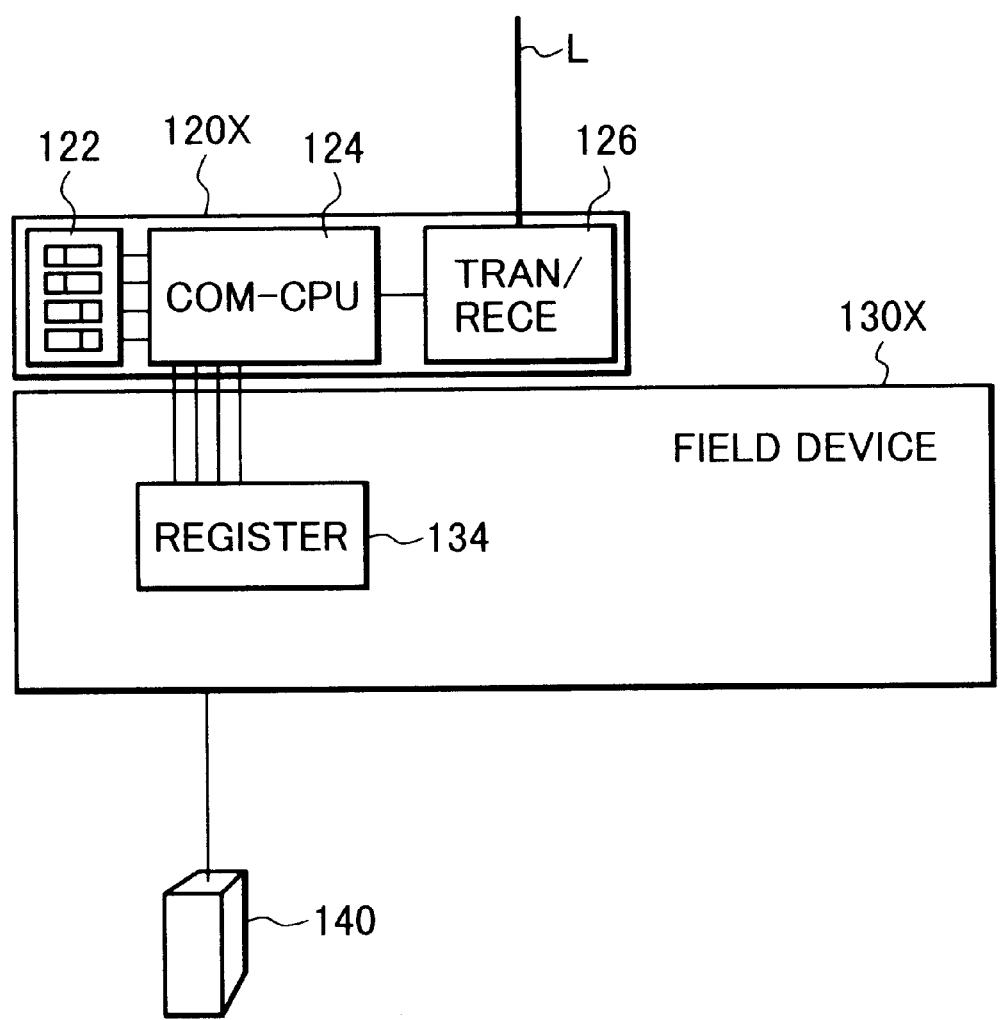
FIG. 7 is a block diagram showing a first example of the construction of a field device and a connector for use in a control system according to a second embodiment of the present invention.

FIG. 7 is a block diagram showing the first example of the construction of the field device and the connector for use in the control system according to the second embodiment of the present invention. Note that the entire construction of the control system of this second embodiment is similar to that shown in FIG. 1. Also, the same numerals in FIG. 7 as those in FIG. 1 denote the same components.

This second embodiment is featured in that the connector 120X has the function of communicating with the host controller 110 and takes out information of the field device 130X to exchange communication with the host controller 110. Since the field device 130X does not include the communication CPU, the cost of the field device 130X can be cut down. Therefore, this second embodiment is advantageous in the case where the field device 130X is a consumable and required to be replaced frequently, for example, at the time of maintenance.

The field device 130X includes a register 134. The register 134 holds the device ID therein. An output value read out of the photosensor 140 is also held in the register 134. The connector 120X includes a DIP switch 122, a communication CPU 124, and a transmitter/receiver 126. The DIP switch 122 holds the network ID of the connector 120X, which is unique on the network. The setting of the network ID can be changed by shifting on/off positions of the DIP switch 122. The communication CPU 124 calculates a node address from the network ID set by the DIP switch 122 and the device ID held by the register 134 of the field device 130X, and exchanges communication with the host controller 110 via the transmission line L using the node address. When a command requesting a sensor output value, for example, is transmitted to the field device 130X from the host controller 110, the field device 130X transmits the sensor output value held in the register 134 to the host controller 110.

In FIG. 7, information of the field device 130X is taken out by the connector 120X by a method of electrically connecting the connector 120X and the field device 130X to each other. However, information of the field device 130X may be taken out by any of other suitable methods such as infrared and radio communication between the connector 120X and the field device 130X. Those methods are now described with reference to FIGS. 8 and 9.

Figure 8:
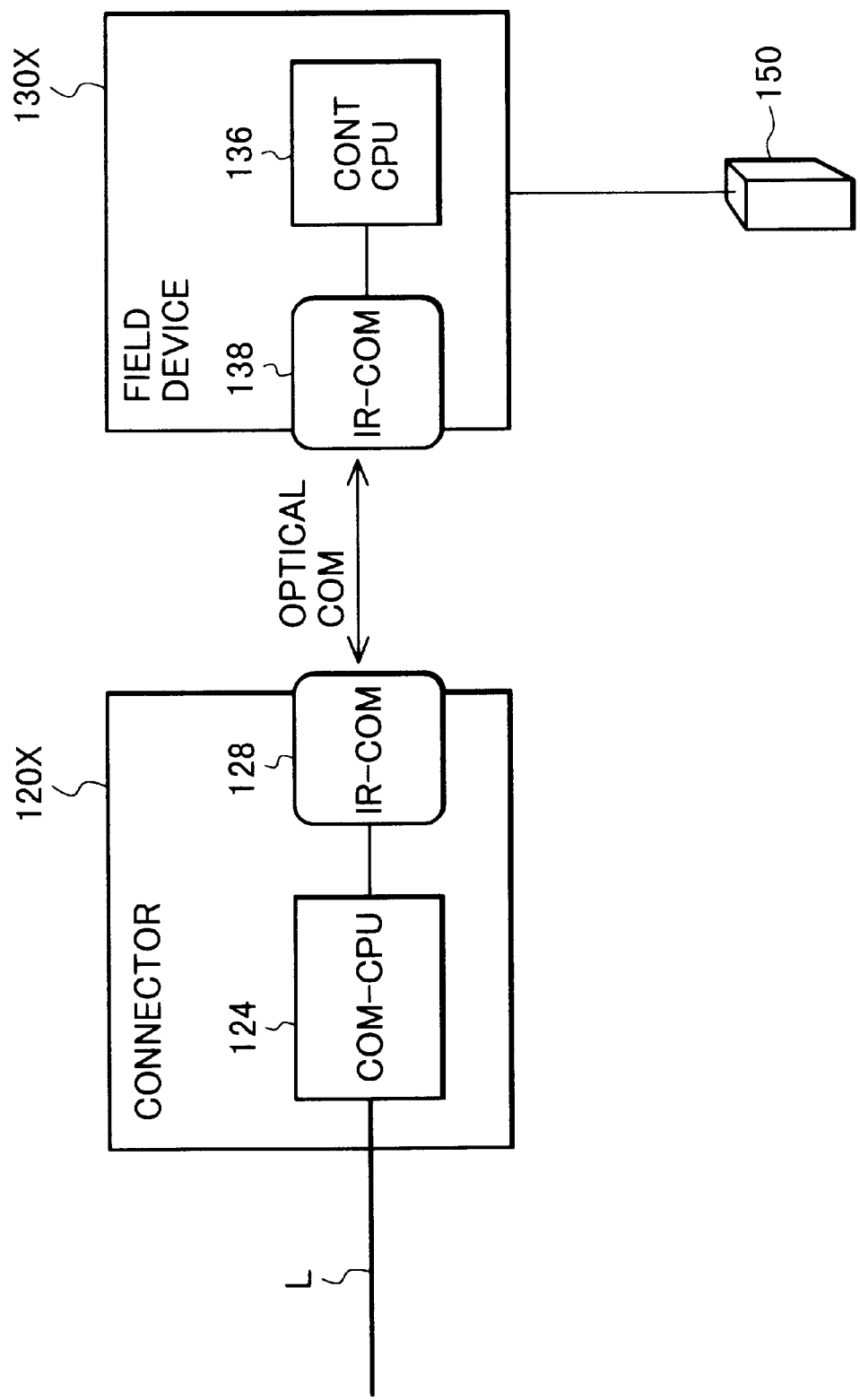
FIG. 8 is a block diagram showing a second example of the construction of the field device and the connector for use in the control system according to the second embodiment of the present invention.

FIG. 8 is a block diagram showing a second example of the construction of the field device and the connector for use in the control system according to the second embodiment of the present invention.

A connector 120X includes a communication CPU 124 and an infrared communication unit 128. A field device 130X includes a control CPU 136 and an infrared communication unit 138. The communication CPU 124 receives a command destined for its node address via the transmission line L and exchanges infrared communication with the field device 130X through the infrared communication unit 128. The infrared communication unit 138 receives data transmitted from the connector 120X and transfers the data to the control CPU 136. The control CPU 136 executes control of the motor driver 150 in accordance with the received data. In use, a space between the field device 130X and the connector 120X is optically shielded to prevent crosstalk during the infrared communication. With such an arrangement, the control system can be constructed to be adaptable for the case where the transmission line L and the field device 130X are required to be electrically isolated from each other.

Figure 9:
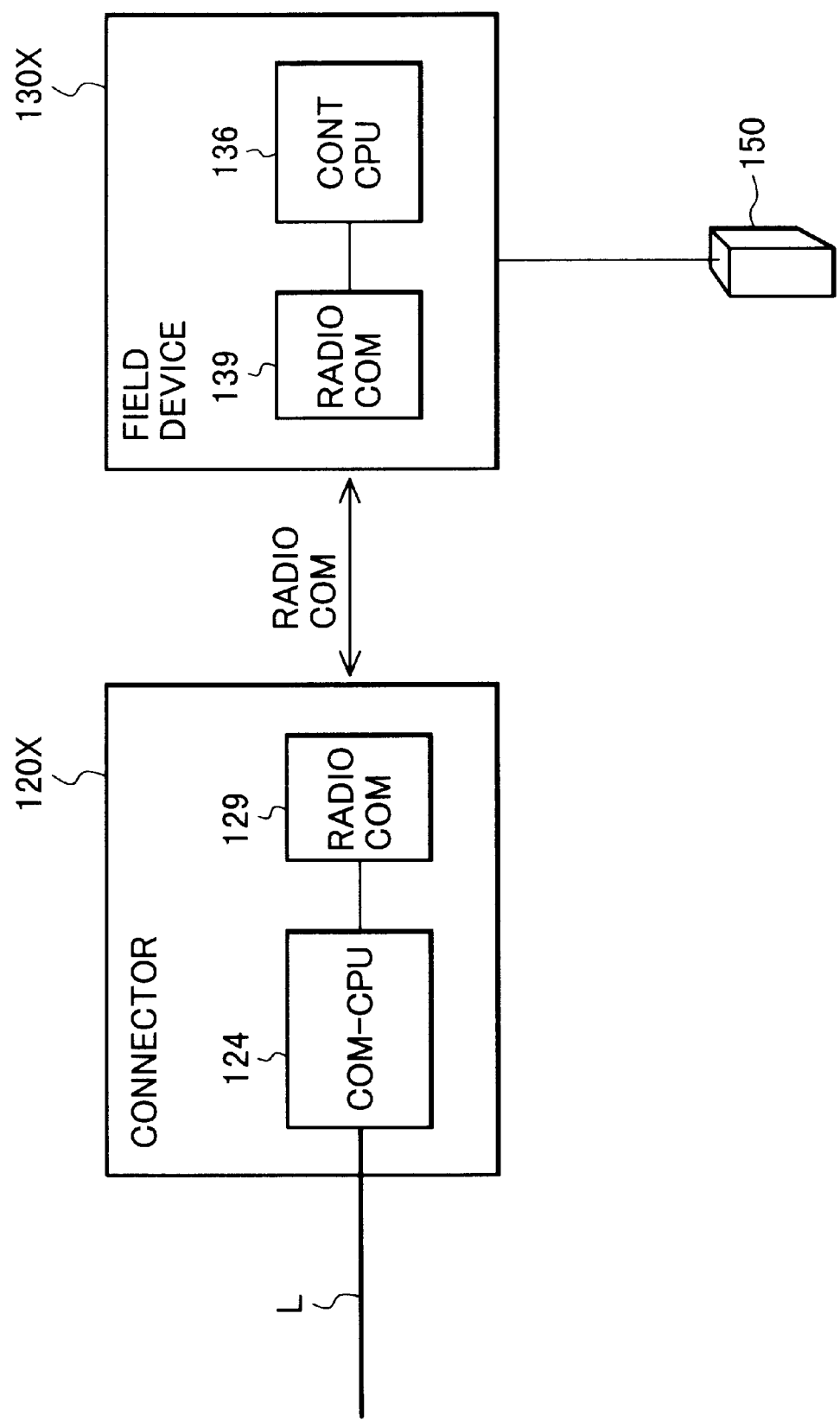
FIG. 9 is a block diagram showing a third example of the construction of the field device and the connector for use in the control system according to the second embodiment of the present invention.

FIG. 9 is a block diagram showing a third example of the construction of the field device and the connector for use in the control system according to the second embodiment of the present invention.

A connector 120X includes a communication CPU 124 and a radio communication unit 129. A field device 130X includes a control CPU 136 and a radio communication unit 139. When the field device 130X and the connector 120X are spatially remote from each other, for example, radio communication is exchanged between the field device 130X and the connector 120X. The communication CPU 124 receives a command destined for its node address via the transmission line L and exchanges radio communication with the field device 130X through the radio communication unit 129. The radio communication unit 139 receives data transmitted from the connector 120X and transfers the data to the control CPU 136. The control CPU 136 executes control of the motor driver 150 in accordance with the received data. This example is effective in the case where the distance between the field device 130X and the connector 120X is too far to exchange data through infrared communication in large-scale equipment. However, when the system includes a plurality of nodes, some measure, such as using different frequency for each node, is necessary to prevent crosstalk.

As described above, the construction shown in FIG. 8 or FIG. 9 can be employed in a system in which the transmission line L and the field device 130X are required to be separate from each other. In such a case, if the communication CPU and the infrared or radio communication unit are installed in each connector, the system cost is increased. A system having good cost performance can be constructed by utilizing infrared or radio communication in only a section where the field device and the network are required to be separate from each other, and by employing the connector and the field device, which are directly contacted with each other, in the other section.

The arrangement of the above second or third example is effective particularly in the case, for example, where power consumption of the field device is so large that the field device and the network should be operated by separate power supplies while keeping them electrically isolated from each other, or where the field device is connected to a moving member and it is required to avoid the status of electrical connection from deteriorating due to metal fatigue.

Several preferred embodiments of the present invention have been described above, but the present invention is not limited to those embodiments. According to the features of the present invention, maintainability and operability can be improved in a control system.

What is claimed is:

1. A control system comprising a plurality of field devices distributed in equipment and controlling input/output means, and a host controller connected to said plurality of field devices via a transmission line and controlling said field devices, said field devices and said host controller constituting a network in said equipment for control of said equipment, said control system further comprising:

a plurality of connectors for connecting said plurality of field devices to said transmission line, said connectors having network IDs representing respective connected positions to said network; and node address creating means for generating node addresses based on the network IDs;

wherein said connector includes a switch group corresponding with the network ID; and said node address creating means reads on/off status of said switch group and creates the node address.

2. A control system according to claim 1, wherein said field device has a device ID representing the type of said field device; and said node address creating means creates the node address based on the network ID in said connector and the device ID.

3. A control system according to claim 1, wherein said connector comprises a control circuit including a communication circuit;

said field device has a device ID representing the type of said field device; and said connector reads the device ID from said field device, creates the node address, and performs communication.

4. A control system according to claim 3, further comprising communication means for exchanging communication between said connector and said field device, said connector taking out information of said field device and performing communication over said network.

5. A control system according to claim 4, wherein said communication means is means for performing optical or radio communication.

6. A startup method for a control system comprising a plurality of field devices for controlling input/output means; and a host controller connected to said plurality of field devices via a transmission line and controlling said field devices, said plurality of field devices and said host controller constituting a network, said startup method comprising the steps of:

broadcasting, from each of said field devices, its own node address over said network; and comparing, in each of the other field devices, the received node address with its own node address, and, if both the compared node addresses are the same, transmitting a signal indicating an abnormal condition to the same node address, wherein the field device having transmitted the signal indicating an abnormal condition and the field device having received the signal indicating an abnormal condition each provide an indication of node address overlap.

* * * * *